US012769072B2

(12) United States Patent
Gomes Ferreirinho Lima Rodrigues et al.

(10) Patent No.: US 12,769,072 B2
(45) Date of Patent: Oct. 20, 2026

(54) DUAL XGS-PON 10 GIGABIT SMALL FORM FACTOR PLUGGABLE PLUS OPTICAL MODULE

(71) Applicant: ALTICE LABS, S.A., Aveiro (PT)

(72) Inventors: Cláudio Emanuel Gomes Ferreirinho Lima Rodrigues, Aveiro (PT); Paulo Jorge Da Costa Mão Cheia, Aveiro (PT); Joaquim Fernando Vale E Serra, Aveiro (PT); Alfonso Carlos Antero Miranda Figueiredo, Aveiro (PT); Tiago Manuel Campos, Aveiro (PT); Luis Miguel Amaral Henriques, Aveiro (PT)

(73) Assignee: ALTICE LABS, S.A., Aveiro (PT)

( * ) Notice: Subject to any disclaimer, the term of this patent is extended or adjusted under 35 U.S.C. 154(b) by 269 days.

(21) Appl. No.: 18/291,134

(22) PCT Filed: Jul. 5, 2022

(86) PCT No.: PCT/IB2022/056202
§ 371 (c)(1),
(2) Date: Jan. 22, 2024

(87) PCT Pub. No.: WO2023/002283
PCT Pub. Date: Jan. 26, 2023

(65) Prior Publication Data

US 2024/0361544 A1 Oct. 31, 2024

(30) Foreign Application Priority Data

Jul. 21, 2021 (PT) ........................................ 117354

(51) Int. Cl.
*H04B 10/00* (2013.01)
*G02B 6/42* (2006.01)
(Continued)

(52) U.S. Cl.
CPC ......... *G02B 6/4246* (2013.01); *G02B 6/4261* (2013.01); *G02B 6/4281* (2013.01); *H04B 10/503* (2013.01); *H04Q 11/0067* (2013.01)

(58) Field of Classification Search
CPC .. G02B 6/4246; G02B 6/4261; G02B 6/4281; G02B 6/4292; H04B 10/503; H04B 10/40; H04Q 11/0067; H04J 14/00
See application file for complete search history.

(56) References Cited

U.S. PATENT DOCUMENTS 9,143,261 B2 * 9/2015 Takahashi ............ H04B 10/506
9,419,717 B2 * 8/2016 Huang .................. H04B 10/40
(Continued)

FOREIGN PATENT DOCUMENTS

CN 101938677 A 1/2011
CN 202268893 U 6/2012
KR 20160120385 A 10/2016

OTHER PUBLICATIONS

International Search Report and Written Opinion mailed Sep. 29, 2022, by the International Searching Authority in International Application No. PCT/IB2022/056202.

*Primary Examiner* — Agustin Bello
(74) *Attorney, Agent, or Firm* — ArentFox Schiff LLP

(57) ABSTRACT

The present invention relates to a dual XGS-PON Small Form-Factor Pluggable Plus optical module, projected to provide connection to two SC optical fiber connectors, and to be incorporated in any state of the art SFP plus transceiver host to allow double XGS-PON-OLT channels. The module comprises a case housing a specific set of technical elements such as bidirectional optical subassemblies, high-speed electrical interface, and all the necessary electronic circuits, printed circuit board and flex-printed circuit board to ensure proper assembly and electronic performance of all elements.

15 Claims, 4 Drawing Sheets

(51) Int. Cl.
*H04B 10/50* (2013.01)
*H04Q 11/00* (2006.01)

(56) References Cited

U.S. PATENT DOCUMENTS

| | | | | |
|---|---|---|---|---|
| 9,866,328 | B2 * | 1/2018 | Wang | G02B 6/42 |
| 9,965,433 | B2 * | 5/2018 | Tomada | G06F 13/4027 |
| 10,175,431 | B2 * | 1/2019 | Lin | G02B 6/29329 |
| 10,444,452 | B2 * | 10/2019 | Noguchi | H05K 1/147 |
| 10,466,432 | B2 * | 11/2019 | Luo | G02B 6/43 |
| 10,555,435 | B2 * | 2/2020 | White | H01R 24/50 |
| 11,178,473 | B1 * | 11/2021 | Nagarajan | H04B 10/40 |
| 11,409,062 | B2 * | 8/2022 | Chang | G02B 6/4246 |
| 11,719,898 | B2 * | 8/2023 | Nagarajan | G02B 6/43 398/164 |
| 11,994,726 | B2 * | 5/2024 | Zhang | G02B 6/4292 |
| 12,136,945 | B2 * | 11/2024 | Chanclou | G02B 6/2804 |
| 12,405,431 | B2 * | 9/2025 | Zhang | G02B 6/4215 |
| 12,468,100 | B2 * | 11/2025 | Chen | G02B 6/3897 |
| 12,517,315 | B2 * | 1/2026 | Chen | G02B 6/4292 |
| 2004/0175077 | A1 * | 9/2004 | Weber | H04J 14/02 385/88 |
| 2009/0052898 | A1 * | 2/2009 | Oki | H04B 10/40 398/79 |
| 2011/0229096 | A1 * | 9/2011 | Oki | G02B 6/4274 385/88 |
| 2012/0275784 | A1 * | 11/2012 | Soto | H04B 10/2589 398/67 |
| 2015/0155963 | A1 * | 6/2015 | Tang | H04B 10/40 398/83 |
| 2015/0201528 | A1 * | 7/2015 | Lebo | G02B 6/4269 361/703 |
| 2016/0187596 | A1 * | 6/2016 | Ista | G02B 6/4284 385/58 |
| 2016/0191166 | A1 * | 6/2016 | Wang | G02B 6/42 398/135 |
| 2016/0216466 | A1 * | 7/2016 | Tang | G02B 6/4292 |
| 2016/0301494 | A1 * | 10/2016 | Wen | G02B 6/29361 |
| 2018/0254831 | A1 * | 9/2018 | Ishii | H05K 1/0274 |
| 2019/0146167 | A1 * | 5/2019 | Leigh | H05K 1/181 361/715 |
| 2020/0012055 | A1 * | 1/2020 | Ye | G02B 6/29367 |
| 2022/0006253 | A1 * | 1/2022 | Li | G02B 6/4207 |
| 2022/0107477 | A1 * | 4/2022 | Chi | G02B 6/4284 |
| 2022/0416887 | A1 * | 12/2022 | Chanclou | H04B 10/40 |
| 2023/0283378 | A1 * | 9/2023 | Gomes Ferreirinho Lima Rodrigues | H04B 10/40 398/135 |
| 2023/0418014 | A1 * | 12/2023 | Selli | G02B 6/44528 |
| 2024/0361544 | A1 * | 10/2024 | Gomes Ferreirinho Lima Rodrigues | G02B 6/4281 |
| 2025/0060543 | A1 * | 2/2025 | Gomes Ferreirinho Lima Rodrigues | G02B 6/4292 |
| 2025/0132836 | A1 * | 4/2025 | Gomes Ferreirinho Lima Rodrigues | G02B 6/4281 |
| 2025/0358551 | A1 * | 11/2025 | Wei | H04Q 11/0003 |

* cited by examiner

| Pin No. | PIN Assignment |
|---|---|
| 1 | XGSPON1_TD+ |
| 2 | XGSPON1_TD- |
| 3 | GND |
| 4 | SDA |
| 5 | SCL |
| 6 | XGSPON1_RD- |
| 7 | XGSPON2_Reset |
| 8 | XGSPON2_SD |
| 9 | Trig_TxDisable |
| 10 | XGSPON1_RD+ |
| 11 | GND |
| 12 | XGSPON2_RD- |
| 13 | XGSPON2_RD+ |
| 14 | XGSPON1_SD |
| 15 | VccR |
| 16 | VccT |
| 17 | XGSPON1_Reset |
| 18 | XGSPON2_TD+ |
| 19 | XGSPON2_TD- |
| 20 | GND |

Figure 3

DUAL XGS-PON 10 GIGABIT SMALL FORM FACTOR PLUGGABLE PLUS OPTICAL MODULE

CROSS-REFERENCE TO RELATED APPLICATIONS

This application is a National Stage entry of International Application No. PCT/IB2022/056202, filed Jul. 5, 2022, which claims priority to Portuguese Patent Application No. 117354, filed Jul. 21, 2021. The disclosures of the priority applications are hereby incorporated in their entirety by reference.

FIELD OF THE INVENTION

The present invention is enclosed in the area of 10 Gigabit-capable symmetric passive optical network line terminals (XGS-PON-OLT), particularly in the field of 10 Gigabit small form-factor pluggable Plus (SFP+) modules.

PRIOR ART

10 Gigabit-capable symmetric Passive Optical Network (XGS-PON) is spreading among operators allowing the distribution of very high bandwidth, large coverage and providing high efficiency to deliver broadband. It is a new PON technology capable of coexist in the same physical network with legacy Gigabit-capable Passive Optical Network (GPON) Based on International Telecommunication Union-Telecommunication Standardization Sector (ITU-T) G.984.x—by using different downstream and upstream wavelengths. XGS-PON is based on International Telecommunication Union-Telecommunication Standardization Sector (ITU-T) G. 907.x-XGS-PON Optical Line Terminals (OLTs) commonly use SFP plus transceiver hosts equipped with 10 Gigabit SFP plus in a single fiber bidirectional SC connector configuration for carrying out the transmission and reception of the 10 Gigabit passive optical network (PON) data.

Problem to be Solved

Current XGS-PON 10G SFP plus optical transceiver modules employ a single fiber bidirectional SC connector, limiting the port density on the XGS-PON-OLT, where a single 10 Gigabit SFP plus transceiver host equipped with a 10 Gigabit SFP plus is adapted to feed a XGS-PON, limiting the number of users connected to said host and thereby limiting also its density.

The present invention addresses the above problem.

SUMMARY OF THE INVENTION

The present invention relates to a dual XGS-PON 10 Gigabit Small Form-Factor Pluggable (DXGS-PONSFP+) optical module, projected to provide connection to two SC optical fiber connectors, and to be incorporated in any state of the art XGS-PON-OLT.

Due to the set of particular technical features that characterizes the DXGS-PONSFP+ optical module developed, it is not only possible to duplicate the number of users connected to the same 10 Gigabit SFP transceiver host's cage—that is, for the same cage space it allows to double the density of transceiver—but also allows transmitting and receiving two XGS-PON channels in a single SFP optical transceiver.

10—DXGS-PONSFP+ optical module;
110—bidirectional optical subassemblies;
111—electrical circuit;
112—high-speed electrical interface;
113—case;
114—flex—printed circuit board;
115—printed circuit board.

Figure 2:
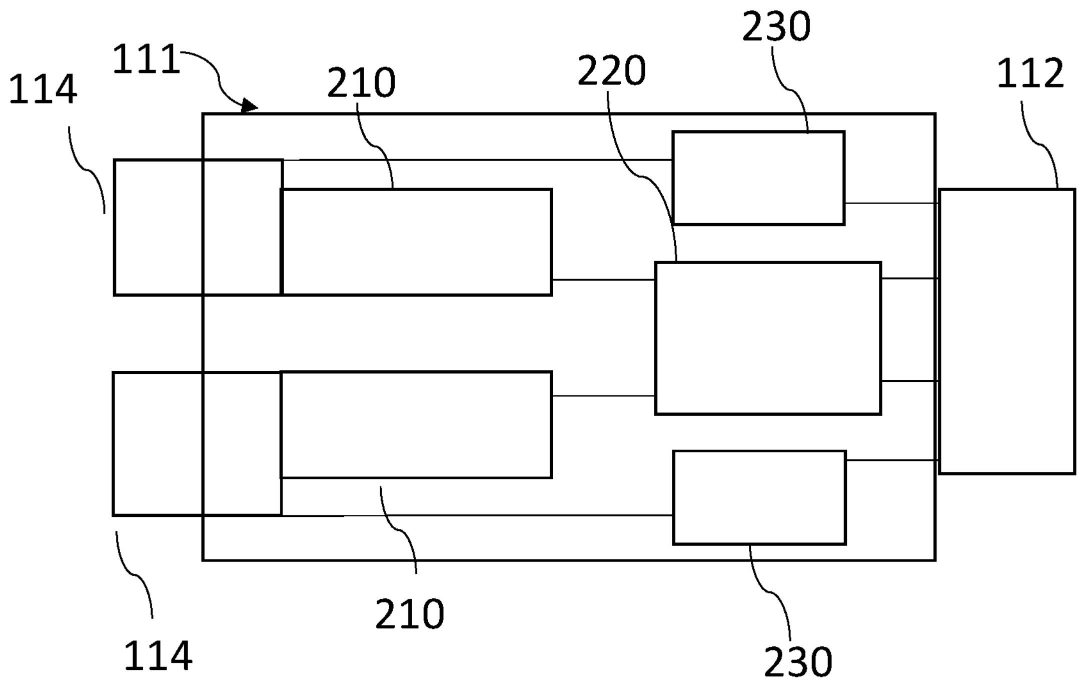

FIG. 2 is a schematic diagram of the DXGS-PONSFP+ module's control unit, according to certain aspects of the invention. The numerical references represent:

111—control unit;
112—high-speed electrical interface;
114—flex-printed circuit board;
210—modulation sub-unit;
220—microcontroller;
230—power supply.

FIG. 3 is a diagram of the DXGS-PONSFP+'s module contact assignment of the high-speed electrical interface to the SFP transceiver host in order to support the dual GPON, according to certain aspects of the invention.

Figure 4:
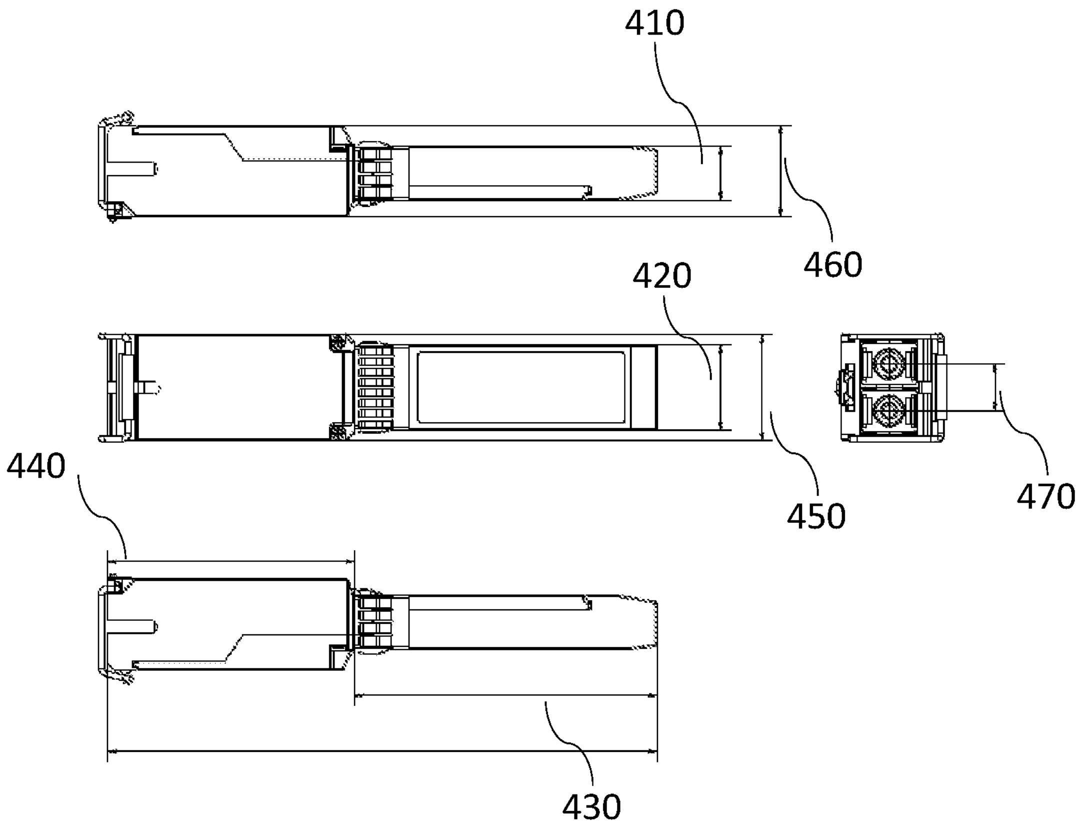

The module contact assignment is defined as:

Pin number 1-XGSPON1 TD+—Transmit Non-Inverted XGSPON1 Data Input;
Pin number 2-XGSPON1 TD—Transmit Inverted GPON1 Data Input;
Pin number 3—GND—Module ground;
Pin number 4—SDA—2-Wire Serial Interface Data Line;
Pin number 5—SCL—2-Wire Serial Interface Clock;
Pin number 6—XGSPON1 RD—Receive Burst Mode Inverted XGSPON1 Data output;
Pin number 7—XGSPON2 Reset—Reset Receiver Burst Mode XGSPON2;
Pin number 8—XGSPON2_SD—Receiver Signal Detect indicator for XGSPON2 receiver;
Pin number 9—Trig TxDisable—Two signals multiplex, which are selected by register: Receiver signal strength indication trigger and transmitter disable;
Pin number 10—XGSPON1 RD+—Receive Burst Mode Non-Inverted XGSPON1 Data output;
Pin number 11—GND—module ground;
Pin number 12—XGSPON2 RD—Receive Burst Mode Inverted XGSPON2 Data output;
Pin number 13—XGSPON2 RD+—Receive Burst Mode Non-Inverted XGSPON2 Data output;
Pin number 14—XGSPON1_SD—Receiver Signal Detect indicator for XGSPON1 receiver;
Pin number 15—VccR—power supply for receiver;
Pin number 16—VccT—power supply for transmitter;
Pin number 17—XGSPON1 Reset—Reset Receiver Burst Mode XGSPON1;
Pin number 18—XGSPON2 TD+—Transmit Non-Inverted XGSPON2 Data Input;
Pin number 19—XGSPON2 TD—Transmit Inverted XGSPON2 Data Input;
Pin number 20—GND—Module ground;

FIG. 4 is a view of the case of the DXGS-PONSFP+'s optical module developed with a dual SC connector for integrating two GPON-OLT channels, according to certain aspects of the invention. The numerical references represent:

410—height of the rear part;
420—width of the rear part;
430—length of transceiver to the rear part;

440—front length;

450—front width;

460—front height;

470—ferrule distance.

Figure 5:
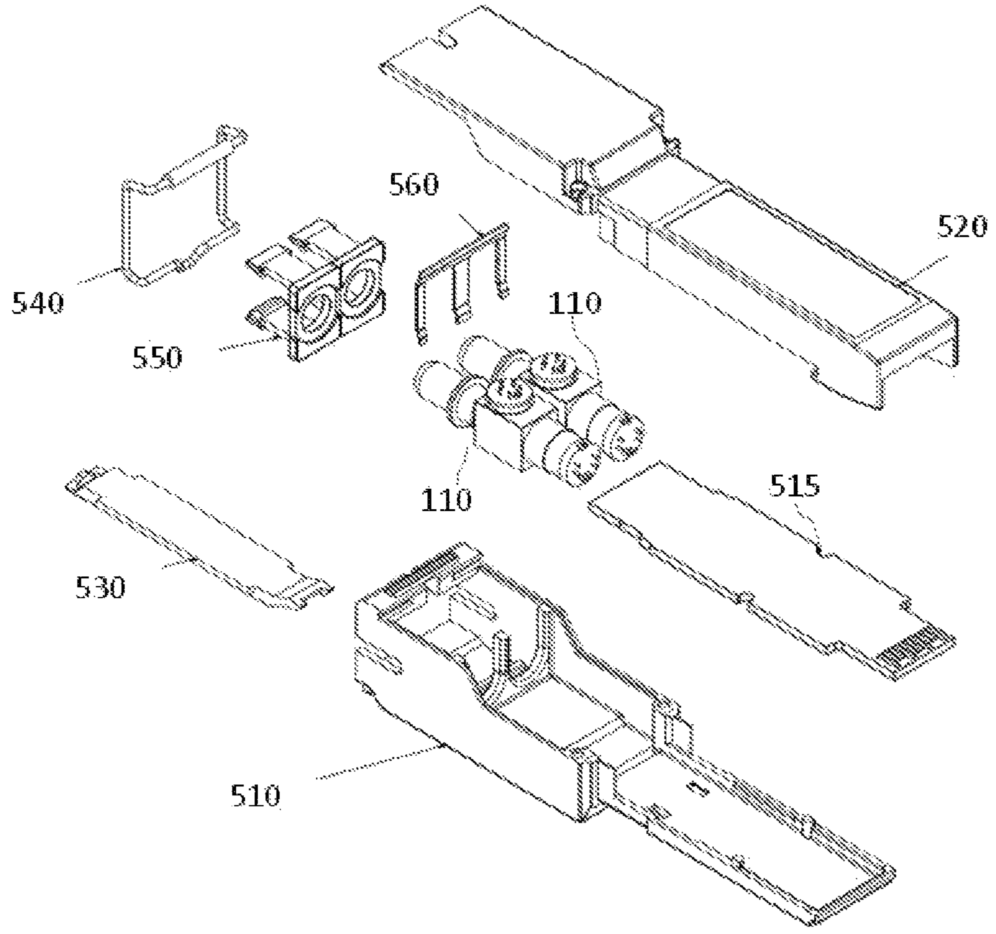

FIG. 5 is an exploded view of the case and internal components of the DXGS-PONSFP+ optical module developed with a dual SC connector, according to certain aspects of the invention. The numerical references represent:

110—bidirectional optical subassemblies;

115—printed circuit board;

510—bottom case;

520—top case;

530—actuator tines;

540—pull-tab;

550—SC bidirectional optical subassemblies support;

560—case spacer.

DETAILED DESCRIPTION

The following detailed description has references to the figures. Parts which are common in different figures have been referred to using the same numbers. Also, the following detailed description does not limit the scope of the disclosure.

The present invention relates to a DXGS-PONSFP+ optical module comprising a dual SC connector, projected to be connected in a SFP transceiver host, allowing it to operate as a dual XGS-PON transmitter and receiver.

According to the main embodiment of the invention, the DXGS-PONSFP+ optical module (10) is comprised by at least two bidirectional optical subassemblies—BOSAs—(110), a control unit (111) comprising connection and processing means adapted to drive and control said BOSAs (110) and a high-speed electrical interface—HSEI—(112) adapted to provide connection to the SFP plus transceiver host, in order to feed several Optical Network Units. These elements comprising the DXGS-PONSFP+ optical module (10) are housed in a case (113) which is to be installed inside the SFP plus transceiver host cage of an XGS-PON-OLT.

Figure 1:
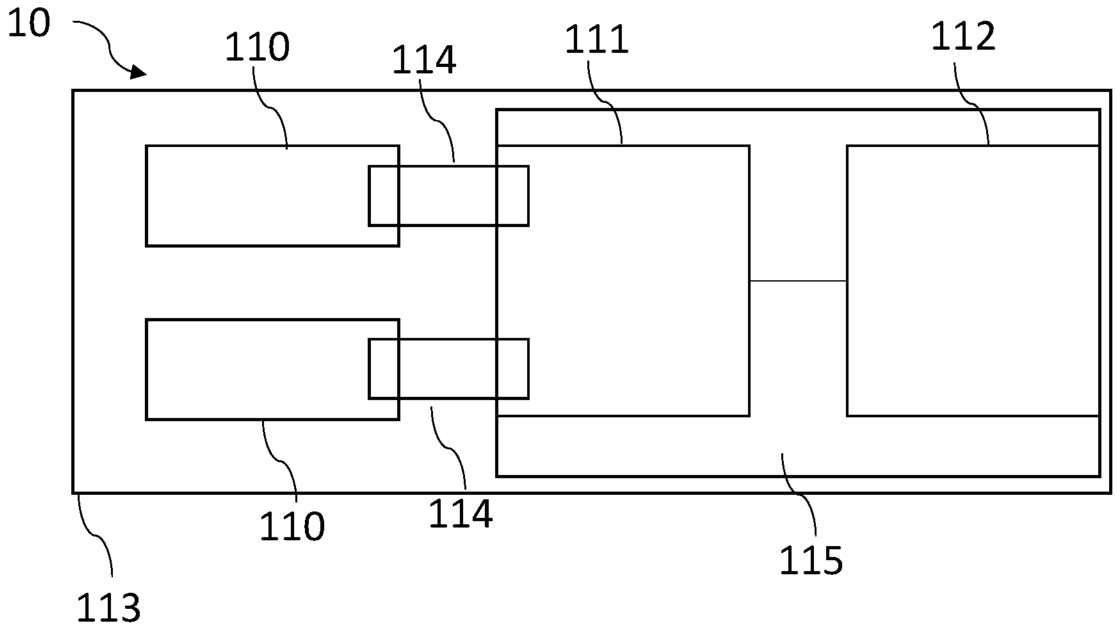
FIG. 1 is a schematic diagram of the DXGS-PONSFP+ optical module developed, according to certain aspects of the invention. The numerical references represent.

FIG. 1 illustrated the block diagram of an exemplary embodiment of the DXGS-PONSFP+ optical module (10) of the invention. It is comprised by the case (113) housing two BOSAs (110) for XGS-PON-OLT connection, the control unit (111) and the high-speed electrical interface (112).

Each BOSA (110) is composed by a laser working on XGS-PON downstream wavelength at 9.95 Gbit/s and a dual rate burst mode receiver working on XGS-PON upstream wavelength at 2.48 Gbit/s and 9.95 Gbit/s. The BOSA (110) further includes an SC ferrule to allow the connection to an SC optical fiber connector. In the particular embodiment of the DXGS-PONSFP+ module (10) developed as illustrated in FIG. 1, two BOSAs (110) provides connection to two SC optical fiber connectors.

The control unit (111) is shown in FIG. 2, and is adapted to control the two BOSAs (110). For that purpose, the control unit (111) comprises a modulation sub-unit (210) and a microcontroller (220), besides the required circuit electronics that comprises resistors, capacitors, power supply (230) and ferrite bead. The modulation sub-unit (210) comprises laser drivers and limiting amplifiers adapted to drive and modulate the lasers and to amplify the electrical signals from the dual rate burst mode receiver of each BOSA (110). The microcontroller (220) is configured to control the modulation sub-units (210) and to communicate with the SFP plus transceiver host through the HSEI (112). The microcontroller (210) is also configured to control the BOSAs power supplies (230). In one embodiment, the two BOSAs (110) are connected to the control unit (111) through a flex printed circuit board (114). More particularly, each BOSA (110) is connected to the modulation sub-unit (210) of the control unit (111), and in particular to the respective laser driver and limiting amplifier, by means of the flexible printed circuit board (114), in order to guarantee the electronic performance. In another embodiment, the control unit (111) is mounted in a printed circuit board (115) containing all the necessary electrical connections between the different elements in order to control and drive the BOSAs (110).

The HSEI (112) is configured to provide a high-speed interconnection to the SFP plus transceiver host, in order to transmit electrical signals that were transformed by the DXGS-PONSFP+ optical module (10) from the PON data received. Similarly, the DXGS-PONSFP+ optical module (10) may receive electrical signals from SFP plus transceiver host via said port connector, in order to be transformed to optical signals and sent to a fiber network via optical connection.

For the purpose of that connection with the SFP plus transceiver host, the HSEI (112) comprises a port connector including a plurality of connection pins. In a particular embodiment, the port connector of the HSEI (112) is provided with a specific contact assignment, in order to ensure adaptability and compatibility with the state of the art SFP plus transceiver hosts. In accordance with a particular embodiment of the HSEI (112), FIG. 3 depicts a port connector and respective receptable which is comprised by twenty pins: In the referred embodiment, pins 3-5, 7, 9, 11-13, 15-16, and 18-20 may have the same signal as in a conventional XGS-PON SFP plus pin assignment, and may be physically similar to the pin portion of a twenty-pin connector case used for conventional XGS-PON SFP plus optical modules. This may allow the DXGS-PONSFP+ optical module (10) now developed to be inserted into a SFP transceiver host configured to incorporate DXGS-PONSFP+ optical modules or conventional XGS-PON SFP plus optical modules. On the other hand, pins 1-2, 6, 8, 10, 14, and 17 may be used for providing a second XGS-PON channel. This allows for compatibility with conventional SFP plus optical transceivers, which are single channel module, and DXGS-PONSFP+ modules (10), which may be a dual channel module. In the particular embodiment illustrated in FIG. 3, pin 6 is used to both disable the lasers transmission and to measure the optical input power on the receivers of the BOSA, representing the remote signal strength indication-RSSI. This pin function is selected on a memory pin map of the DXGS-PONSFP+ module, through the SDA (data line) and SCL (clock line) pins, stored on the memory of the microcontroller (220), in order to act as transmitter disable of first BOSA (110), transmitter disable of second BOSA (110) or as RSSI of the first BOSA (110) and RSSI of the second BOSA (110).

FIG. 4 illustrates the mechanical case (113) design of the DXGS-PONSFP+ optical module (10) developed. It assumes a standard size inside a cage assembly: height rear (410), width rear (420) and length of transceiver outside of cage to rear (430), following the Transceiver Multisource Agreement—MSA—in order to fit on a standard SFP plus Cage Assembly of the SFP plus transceiver host. The DXGS-PONSFP+ optical module (10) dimensions outside of the cage MSA, in order to fit two SC connectors, assume a specific front length (440) of 38, 75 mm, front width (450) of 16, 8 mm, front height (460) of 14.4 mm and a BOSA ferrule distance (470) of 7.35 mm.

The DXGS-PONSFP+ optical module comprises a case (113) which includes two SC BOSA supports (550) and a case spacer (560) adapted to accommodate the installation of the two BOSAs (110). Additionally, and as shown in FIG. 5, the case (113) may also comprise other mechanical parts such as a bottom case (510), a top case (520), one actuator tine (530) to allow the extraction of the DXGS-PONSFP+ optical module (10) from the SFP plus transceiver host case, and a pull-tab (540) to allow to manually pull the DXGS-PONSFP+ optical module (10).

The DXGS-PONSFP+ optical module mechanical parts, (510), (520), (530), (540), (560) are made from several types of metallic materials as zinc alloys, zamak 2, zamak 3 or aluminium. The SC BOSA supports (550) are manufactured in plastic or metal.

The physical geometry of the DXGS-PONSFP+ optical module (10) developed is to be such that it may fit within the receptacle case of a conventional XGS-PON-OLT transceiver.

The DXGS-PONSFP+ optical module (10) developed may be one of multiple DXGS-PONSFP+ optical modules (10) incorporated into SFP transceiver hosts of a XGS-PON-OLT. In certain embodiments, inserting a DXGS-PONSFP+ optical module (10) into a SFP transceiver host configured to operate with conventional XGS-PON SFP plus optical modules, may result in the DXGS-PONSFP+ optical module (10) be only able to establish a single optical connection. Similarly, adding a conventional XGS-PON SFP plus optical modules to a SFP plus transceiver host configured to operate with a DXGS-PONSFP+ optical module may limit the transceiver to only a single optical XGS-PON connection.

As will be clear to one skilled in the art, the present invention should not be limited to the embodiments described herein, and a number of changes are possible which remain within the scope of the present invention:

Of course, the preferred embodiments shown above are combinable, in the different possible forms, being herein avoided the repetition all such combinations.

The invention claimed is:

1. A dual ten gigabit passive optical network small form-factor pluggable plus, DXGS-PONSFP+, optical module configured to provide connection to two SC optical fiber connectors, and to be incorporated in a small form-factor, SFP, plus transceiver host of a ten gigabit passive optical network line terminal—XGS-PON-OLT—characterized by comprising:

a case projected to house:

two bidirectional optical subassemblies, BOSAs, wherein each BOSA is configured to provide connection to a XGS-PON-OLT; each of the BOSAs comprising an SC ferrule adapted to provide connection to a respective SC optical fiber connector of the two SC optical fiber connectors;

a control unit comprising connection means, adapted to provide connection to each BOSA, and a microcontroller comprising processing means configure to control an operation of each BOSA; and a high-speed electrical interface, HSEI, adapted to provide connection between the microcontroller and a SFP plus transceiver host where the DXGS-PONSFP+ is incorporated.

2. The DXGS-PONSFP+ optical module according to claim 1, wherein each BOSA comprises a laser, adapted to operate at ten gigabit passive optical network—XGS-PON—downstream wavelength at 9.95 Gbit/s, and a dual rate burst mode receiver adapted to operate at XGS-PON upstream wavelength at 2.48 Gbit/s and 9.95 Gbit/s.

3. The DXGS-PONSFP+ optical module according to claim 2, wherein the control unit comprises:

a modulation sub-unit including two laser driver and limiting amplifier elements, adapted to drive and modulate the lasers and to amplify electrical signals from the dual rate burst mode receiver of each BOSA; and and wherein, the microcontroller is further configured to control the operation of the modulation sub-unit.

4. The DXGS-PONSFP+ optical module according to claim 3, wherein the connection between each BOSA and the respective laser driver and limiting amplifying of each modulation sub-unit is provided through a flex printed circuit board.

5. The DXGS-PONSFP+ optical module according to claim 1, wherein the HSEI is configured to provided connection to the SFP transceiver host where the DXGS-PONSFP+ is incorporated by means of a port connector.

6. The DXGS-PONSFP+ optical module according to claim 5, wherein the port connector is comprised by a plurality of pins, and wherein the microcontroller further comprises memory means adapted to store a memory pin map of the port connector; the microcontroller being further programmed to select a pin function of each pin of the port connector based on the memory pin map.

7. The DXGS-PONSFP+ optical module according to claim 6, wherein the port connector is comprised by twenty pins.

8. The DXGS-PONSFP+ optical module according to claim 1, wherein the case comprises: two SC BOSA supports and a case spacer to accommodate an installation of the two BOSAs.

9. The DXGS-PONSFP+ optical module according to claim 8, wherein the case further comprises:

a bottom and a top part;

one actuator tine adapted to allow an extraction of the DXGS-PONSFP+ optical module from a SFP transceiver host's cage where it is incorporated; and a pull-tab to allow a manual pull of the DXGS-PONSFP+ module.

10. The DXGS-PONSFP+ optical module according to claim 8, wherein the two SC BOSA supports are made from a plastic material.

11. The DXGS-PONSFP+ optical module according to claim 8 wherein elements of the case are made from metal.

12. The DXGS-PONSFP+ optical module according to claim 11, wherein the case is made from zinc alloys, zamak 2, zamak 3 or aluminium.

13. The DXGS-PONSFP+ optical module according to claim 1, wherein a size of the case is standardized in order to fit within a receptacle cage of a SFP plus transceiver host.

14. A SFP plus transceiver host comprising at least one DXGS-PONSFP+ optical module according to claim 1.

15. A XGS-PON-OLT comprising at least one SFP plus transceiver host as claimed in claim 14.

* * * * *